UNITED STATES PATENT OFFICE.

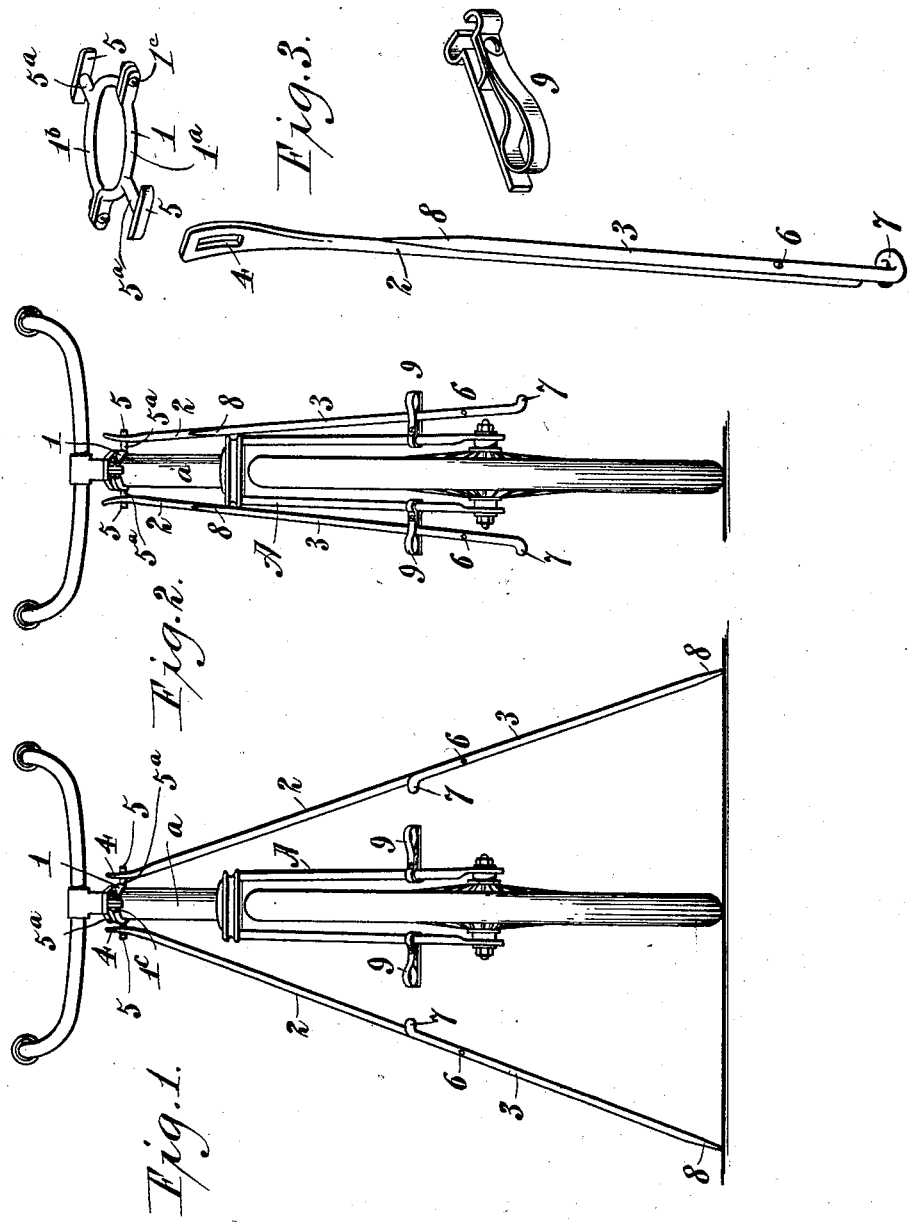

SIMEON D. CHELF, OF KENSINGTON, KANSAS.

BICYCLE-SUPPORT.

1,007,532.  Specification of Letters Patent.  Patented Oct. 31, 1911.

Application filed May 16, 1911. Serial No. 627,463.

*To all whom it may concern:*

Be it known that I, SIMEON D. CHELF, a citizen of the United States, residing at Kensington, in the county of Smith and State of Kansas, have invented new and useful Improvements in Bicycle-Supports, of which the following is a specification.

The present invention relates to certain novel and useful improvements in supports for bicycles.

In carrying out my invention, it is my purpose to provide a support of the character described, which may be attached to and employed in connection with a bicycle, and through means of which the latter may be supported in an upright position, when desired.

Still a further object of my invention is to provide a device comprising the desired features of simplicity and strength, coupled with cheapness in the cost of manufacture and marketing.

Furthermore, it is my intention to provide a support which may be readily and quickly attached to the bicycle, which will support the latter stationarily on any character of surface or ground, and which when not in use may be folded up out of the way and carried along with the bicycle without interfering with the operation of the latter or the convenience of the rider.

With the above-recited objects and others of a similar nature in view, my invention consists in the construction, combination and arrangement of parts, set forth in and forming the scope of the appended claims.

In the accompanying drawing:—Figure 1 is a front view of a bicycle, showing my invention used in connection therewith in supporting position. Fig. 2 is a view, showing my support in collapsed position and folded alongside the fork of the bicycle. Fig. 3 is a detail view of the support.

Referring now to the accompanying drawings in detail, the letter A designates a bicycle around the steering head $a$ of which is clamped a ring or collar 1, formed of the two sections $1^a$ and $1^b$ connected by bolts $1^c$.

My improved support comprises the metallic rods 2 and 3, the upper rod 2 having an elongated slot or eye 4 formed at the end thereof for the reception of the oblong or elongated button head 5 by means of which the rod 2 is attached to the collar 1, the shank $5^a$ of the button being welded or formed integral with the collar and projecting therefrom. The lower rod section 3 is pivoted as at 6 to the lower end of the rod 2, said rod 3 having its end formed with an angular hook 7 designed to engage with the rod 2 when the support is extended. The lower end of the rod 3 is sharpened or pointed as at 8 to penetrate the ground or other surface when the bicycle is at rest and is being supported by the device. It will, of course, be understood, as will be seen in the drawing, that I employ two supports, one at each side of the bicycle, but as they are similar in construction, the above description is applicable to both.

From the above description, taken in connection with the accompanying drawing, the construction and manner of employing my invention will be readily apparent. When not in use, the two sections or members of each rod are folded around the pivot 6, so that the point 8 extends to the upper end of the rod sections 2, as is shown in Fig. 2, when the support may be clamped, if so desired, to the foot rest 9. When it is desired to use the device, the two members are extended and inclined outward and downward, as shown in Fig. 1, so that the points 8 penetrate the ground or surface and the vehicle will be firmly and stationarily supported. It will further be noted that the elongated eye or slot near the end of the rod 2 enables the rod to be readily and quickly attached to the button carried by the collar. The rod when held appropriately and level with the seat may be hooked over the head of the button and then dropped or lowered so that it will assume its supporting position and will not become detached until lifted to unbutton.

Having thus described the invention, I claim:—

1. The combination with a bicycle, of a band or collar attached thereto, buttons carried by said collar, two rod members detachably connected to said collar at the buttons, and a pivoted rod connected to each of said first-mentioned rods and having a hook designed to engage the body of the rod to which it is connected.

2. The combination with a bicycle, of a collar attached thereto, buttons having elongated heads and shank portions connected to the collar, and supporting rods having elongated slots adapted to fit over the buttons and thus detachably connect the rods to the collar.

In testimony whereof I affix my signature in presence of two witnesses.

SIMEON D. CHELF.

Witnesses:
C. W. BOWEN,
BERT U. BOWEN.